(12) United States Patent
Guerra

(10) Patent No.: US 7,653,585 B2
(45) Date of Patent: Jan. 26, 2010

(54) REAL ESTATE COMMISSION BID SYSTEM

(76) Inventor: Eugene J Guerra, 69-40 213th St., Bayside, NY (US) 11364

( * ) Notice: Subject to any disclaimer, the term of this patent is extended or adjusted under 35 U.S.C. 154(b) by 1132 days.

(21) Appl. No.: 10/342,816

(22) Filed: Jan. 15, 2003

(65) Prior Publication Data
US 2009/0276362 A1 Nov. 5, 2009

(51) Int. Cl.
G06Q 40/00 (2006.01)
(52) U.S. Cl. ....................................... 705/37
(58) Field of Classification Search ............... 705/37
See application file for complete search history.

(56) References Cited

U.S. PATENT DOCUMENTS

| | | | |
|---|---|---|---|
| 5,032,989 | A | 7/1991 | Tornetta |
| 5,500,793 | A | 3/1996 | Deming, Jr. et al. |
| 5,664,115 | A | 9/1997 | Fraser |
| 5,754,850 | A | 5/1998 | Janssen |
| 5,873,071 | A | 2/1999 | Ferstenberg |
| 5,924,082 | A | 7/1999 | Silverman et al. |
| 6,023,687 | A | 2/2000 | Weatherly et al. |
| 6,049,781 | A | 4/2000 | Forrest et al. |
| 6,223,165 | B1 | 4/2001 | Lauffer |
| 6,314,404 | B1 | 11/2001 | Good et al. |
| 6,321,202 | B1 | 11/2001 | Raveis, Jr. |
| 6,324,519 | B1 * | 11/2001 | Eldering ........................ 705/14 |
| 7,003,487 | B1 * | 2/2006 | Skirpa .......................... 705/37 |

FOREIGN PATENT DOCUMENTS

CA 2488585 * 5/2006

OTHER PUBLICATIONS

Listlow.com, Mar. 3, 2000 & Oct. 18, 2000, Home page, Buyers, Sellers, Selling Form, Real Estate Agents.*
Pay Lower Commissions By Bidding For Your Realtor, Mar. 1, 2000, Business Wire.*

* cited by examiner

Primary Examiner—Kambiz Abdi
Assistant Examiner—Lindsay M. Maguire
(74) Attorney, Agent, or Firm—Michael I. Kroll

(57) ABSTRACT

A computerized or manual bidding system for real estate commission rates where participating registered licensed real estate brokers can acquire from participating registered real estate property owners the exclusive right to sell contract to broker a real estate property for a predetermined period of time based on placing within a specified period of time the lowest commission rate bid for said property that is equal to or less than the threshold commission rate posted by the seller.

6 Claims, 5 Drawing Sheets

REAL ESTATE COMMISSION BID SYSTEM

BACKGROUND OF THE INVENTION

1. Field of the Invention

The present invention relates generally to real estate sales and, more specifically, to a method whereby participating registered licensed real estate brokers can acquire from participating registered real estate property owners the contract to broker a real estate property for a predetermined period of time based on placing within a specified period of time the lowest commission rate bid for said property that is equal to or less than the threshold commission rate posted by the seller.

The present invention provides real estate brokers with additional clientele by fostering real estate property owners to save thousand of dollars in commissions costs and still avail themselves of professional real estate services by submitting their property with a specified commission rate to a business entity maintaining a database whereupon participating registered licensed real estate brokers can view and bid for the broker contract based on review of the sellers posted highest commission rate that they are willing to pay for the sale of their real estate. The participating real estate brokers can bid between or among themselves under the competitive bidding process to bid less than or equal to the seller specified rate which can garnish further commission rate savings for the seller.

It should also be evident that within a competitive bidding process that all interested bidding parties are on equal footing whether they be a small shop or an interstate conglomerate since brokers are categorized by territory and preferential treatment is afforded to brokers within the available property territory.

The present invention's database administrator or other appropriate official provides means for real estate brokers to register with the database administrator or other appropriate official whereupon the database administrator or other appropriate official will perform a registration procedure that will involve verifying the brokers submitted information and conducting a background check. Once registered the brokers will be territorially classified and be charged a membership fee that may be renewed on a periodic basis. Once registered the brokers will be invited to review a description of the properties and sellers specified maximum commission rates for said properties within their territory and bid on acceptance of the posted commission rates. Since there can be more than one acceptance on a specific property, brokers will have the opportunity to bid a lower commission rate until the posted bid period is over.

Sellers of real estate will be encouraged to list their properties with the system of the present invention because they can save thousands of dollars in commission fees while availing themselves of the formidable marketing and experience of full service real estate brokers.

Sellers contact the business entity and agree to provide an Exclusive Right to Sell Listing Agreement for a predetermined period of time to anyone of the real estate brokers registered with the business entity within the specified territory or adjoining territories, if necessary, that have placed a winning commission rate bid equal to or less than the one stipulated by the real estate property seller. When a property owner indicates their willingness to use the Real Estate Commission Bid System to list their property, someone from the parent or state organization, preferably, a real estate sales agent licensed in the state where the property for sale exists should make a physical visit or visits and, if necessary, phone calls to confirm ownership, location and description of the property, etc. Also, at that time, any forms necessary to proceed with the bidding process should be signed. If the seller finds no brokers willing to provide their services for the seller posted real estate commission rate, the seller can submit the real estate again to the business entity at a higher commission rate. The business entity can limit the number of times that the property seller can submit a new maximum real estate commission rate.

A key component of the present invention comprises registering participating real estate brokers into territories which in the preferred embodiment is the five digit postal zip code whereupon properties registered for bidding within said territories or adjoining territories if necessary can be bid upon by the registered real estate brokers.

The real estate broker who owns or runs the administrative body or bodies in each state and the real estate brokers in each zip code who are allowed to participate in the bidding process are both required to participate in a broker registration procedure. As part of that procedure, the broker must indicate their state license number that authorizes them to be real estate brokers.

All real estate brokers who own or run the administrative body or bodies in each state along with the real estate brokers in each state who are allowed to participate in the bidding process are required to follow all state real estate laws with regard to listing and selling properties in the Real Estate Commission Bid System.

In the event that the administrative body or bodies in each state are to be sold in whole or in part, the parent organization must be given the first right of refusal to purchase all or part of the administrative body or bodies that are for sale in each state.

In the event that the administrative body or bodies in each state are to be sold in whole or in part, the real estate brokers and/or other individuals who are selling or running these entities must sign a non-compete agreement for a period of time to be determined solely by the parent organization.

The one time licensing fee to be paid to the parent organization by the administrative body or bodies to handle the bidding process in each state is strictly non-refundable. If the administrative body or bodies are sold, the new owner or owners must also pay a one time strictly non-refundable licensing fee to the parent organization at or shortly before the time that the entities change hands. The one time strictly non-refundable licensing fee to be charged is determined solely by the parent organization.

The parent organization reserves the right to establish a minimum number of real estate brokers in each zip code in the United States (in 1998 the U.S. Postal Service indicated that there were 42,017 zip codes) who are registered with the Real Estate Commission Bid System and are allowed to participate in the bidding process. In the absence of such a minimum, the parent organization and/or the administrative body or bodies in each state will group zip codes together to provide the property owner with an open and competitive marketplace to conduct the bidding process to list their property for sale. The rules and procedures to handle the grouping of zip codes in the event that a minimum number of real estate brokers are not available in each zip code are to be determined solely by the parent organization.

If the number of real estate brokers in a particular zip code who are registered with our organization and are allowed to participate in the bidding process becomes unmanageable for any reason, the parent organization and/or administrative body or bodies in each state reserve the right to limit broker participation. The rules and procedures to limit broker participation are to be determined solely by the parent organization.

In the event that the property is not sold by the time the Exclusive Right To Sell Agreement expires, any extension of this agreement must be agreed upon by both the property owner and the real estate broker who was awarded the original Exclusive Right To Sell Agreement as a result of providing a successful bid. The commission rate established in the original Exclusive Right To Sell Agreement is the commission rate to be paid by the owner of the property in any subsequent Exclusive Right To Sell Agreements when the property is sold.

The parent organization always reserves the right, at any time, announced or unannounced, to examine any aspect of the Real Estate Commission Bid System operation of any administrative body or bodies in any state and any individual real estate brokers in any state who are registered with our organization and are allowed to participate in the bidding process. This can be accomplished by visits, phone calls or any other suitable methods that the parent organization sees fit. This includes contact by accountants, lawyers or any other appropriate officials or individuals associated with or hired by the parent organization. Any refusals to participate in these examinations by the administrative body or bodies in any state or by registered licensed real estate brokers in any state who are allowed to participate in the bidding process will be considered a very serious violation of the rules established by the parent organization. Appropriate disciplinary measures will be determined solely by the parent organization as it sees fit.

Depending upon individual state laws, procuring leads for real estate listings may be considered to be an activity that can only be handled by licensed real estate professionals. If state law interprets this to be so or not, the administrative body or bodies in each state will be required to have state licensed real estate brokers own or be in charge of the state operation. In order to avoid the appearance of conflict of interest, these real estate brokers will not be allowed to participate in the bidding process for real estate listings.

The administrative body or bodies in each state will be carefully selected and will be charged a one time non-refundable licensing fee paid to the parent organization to handle the bidding process in each state. This fee will be based upon the number of zip codes that exist in the state in which they are authorized to operate. If the administrative body or bodies is sold, the new owner or owners must be approved by the parent organization and the new owner or owners must also pay the one time non-refundable licensing fee to the parent organization based upon the number of zip codes that exist in the state in which they are authorized to operate.

The administrative body or bodies in each state will also be required to pay a monthly royalty fee to the parent organization. This fee will be based upon a percentage of the monthly fees received from each registered real estate broker in the state who are allowed to participate in the bidding process. The remainder of the monthly fees is paid to the administrative body. If more than one administrative body exists in a state, the remainder of the monthly fees is to be paid to the administrative bodies on a proportionate basis which is to be determined by the parent organization.

In order to bring a maximum number of property owners together, with real estate brokers in the appropriate territories or adjoining territories if necessary, and to complete the bidding process in a minimum of time (hopefully, within 24 hours), all bidding activities should be conducted on the Internet on a secure website if business and financial conditions permit. All decisions about whether the bidding process will be conducted on the Internet or not in each state will be made by the parent organization at their discretion.

All fees charged, proportionate payments to be made and other financial decisions are to be made by the parent organization and can be changed at any time by the parent organization upon suitable notice being given. The length of time for suitable notice to be given is to be made by the parent organization at their discretion.

The administrative body or bodies in each state and the registered real estate brokers in each state who are allowed to participate in the bidding process are required to follow all principles, procedures, methods and directives, etc. established by the parent organization. If there are any violations of the above, the parent organization reserves the right to administer penalties (financial or otherwise) including and up to expulsion from the organization without any return of fees paid to be part of the organization and any future right to collect any further fees. Before any penalties are administered, the parent organization will conduct a review of the circumstances concerning the violation or violations in any manner that it sees fit to confirm any wrong doing.

The business entity does not permit any sharing of the Exclusive Right To Sell Contract because two or more real estate brokers bid the exact same commission rate for the same property available for bidding in a given bidding sequence. There will be one winning real estate broker and one winning real estate bid in each bidding sequence. The business entity reserves the right to prepare methods and procedures to handle the situation if two or more brokers bid the exact same commission rate for the same property available for bidding in a given bidding sequence.

2. Description of the Prior Art

There are other real estate system designed for processing real estate. Typical of these is U.S. Pat. No. 5,032,989 issued to Tornetta on Jul. 16, 1991.

Another patent was issued to Deming, Jr. et al. on Mar. 19, 1996 as U.S. Pat. No. 5,500,793. Yet another U.S. Pat. No. 5,664,115 was issued to Fraser on Sep. 2, 1997 and still yet another was issued on May 19, 1998 to Janssen as U.S. Pat. No. 5,754,850.

Another patent was issued to Ferstenberg et al. on Feb. 16, 1999 as U.S. Pat. No. 5,873,071. Yet another U.S. Pat. No. 5,924,082 was issued to Silverman et al. on Jul. 13, 1999. Another was issued to Weatherly et al. on Feb. 8, 2000 as U.S. Pat. No. 6,023,687 and still yet another was issued on Apr. 11, 2000 to Forrest et al. as U.S. Pat. No. 6,049,781.

Another patent was issued to Lauffer on Apr. 24, 2001 as U.S. Pat. No. 6,223,165. Yet another U.S. Pat. No. 6,314,404 was issued to Good et al. on Nov. 6, 2001. Another was issued to Raveis, Jr. on Nov. 20, 2001 as U.S. Pat. No. 6,321,202 and still yet another was issued on Nov. 27, 2001 to Eldering as U.S. Pat. No. 6,324,519.

U.S. Pat. No. 5,032,989

Inventor: Mark A. Tornetta

Issued: Jul. 16, 1991

There is provided a method for locating available real estate properties for sale, lease or rental using a database of available properties at a central location and remote stations which use a graphic interface to select desired regions on a map of the areas in interest. The user begins with a region where they are interested in acquiring property and select an inner area within this region by using a pointing device such as a mouse to designate boundaries on a map displayed on screen. This is then zoomed in on and a second area is selected within the zoomed region. The second area is then cross-referenced with the database of available properties whose approximate locations are then pictorially displayed on screen. Information about the properties can then be obtained in textual form.

U.S. Pat. No. 5,500,793

Inventor: Robert F. Deming, Jr. et al.

Issued: Mar. 19, 1996

A computerized, interactive system to search for and identify possible real property equity exchanges involves the establishment of a data field in an electronic database to enable a user to develop, locate and identify property trade scenarios. A computer is utilized to process data from a plurality of sources, each providing specifics of the owner's exchange desires and the current property's characteristics. The computer reviews trade location desires of the property owner and finds potential trades from the location of other tradable properties. There need not be a direct match or a reciprocal match between two properties for a possible property exchange to be identified. The system allows identification of exchange scenarios involving many different properties, wherein the exchange scenarios can be circular or open ended.

U.S. Pat. No. 5,664,115

Inventor: Richard Fraser

Issued: Sep. 2, 1997

A method and apparatus of automatically matching sellers of property with potential buyers through a communications network (preferably the Internet) in which a host system communicates with the sellers and the potential buyers over telephone or dedicated data transmission lines. The host system obtains and stores a first set of records each corresponding to a property to be sold. The first set of records can then be search by a remote data terminal associated with a potential buyer. The results of this search are then provided to the potential buyer, who indicates specific property listings that the potential buyer may be interested in purchasing. The potential buyer provides identifying information which is then provided to the sellers of the indicated property. Provisions are made to ensure that the sellers who list property support the system. Further, the system permits automatic evaluation of potential buyers to screen buyers whose information does not match minimum criteria provided by the seller.

U.S. Pat. No. 5,754,850

Inventor: Richard R. Janssen

Issued: May 19, 1998

A method and apparatus is provided for a search system based in software running on a personal computer. The personal computer is housed in a kiosk having a touch monitor and a printer. With the search system, selection features are selected and a search based upon these search features is performed. Each item in a database is examined to determine if an item has a given search feature. These search features are categorized into primary and non-primary search features. Items neither satisfying nor closely satisfying a given primary search feature are eliminated from the search. In contrast, items not satisfying a given non-primary feature may remain in a search pool. For both primary and non-primary features, if an item in a database is an exact match to a given search feature, then that item is assigned full points. If an item closely satisfies the search feature then that item is assigned full or partial points. After completion of comparing each primary and non-primary search features with each item in the search pool, predetermined number of items remaining in the search pool with the highest total points are displayed to the user of the search system.

U.S. Pat. No. 5,873,071

Inventor: Robert A. Ferstenberg

Issued: Feb. 16, 1999

In a preferred embodiment, this invention includes software processes distributed on one or more computer systems that exchange messages in order to facilitate an intermediated exchange of financial commodities between a plurality of participants. The messages are exchanged according to a preferred protocol that leads to a satisfactory exchange that meets the objectives of the participants, and that substantially maximizes in a fair manner the total amount of financial commodities exchanged. Optionally, the invention employs heuristic rules in association with the preferred protocol that adapt the protocol to the time and exchange requirements of financial commodities. In other embodiments, this invention is equally applicable to the exchange of any tangible or intangible commodities. In a general embodiment, this invention further includes a preferred message-exchange protocol for the construction of computer programs representing exchange participants and an intermediary. These constructed computer programs exchange messages such that a satisfactory intermediated exchange of commodities is substantially certain to be achieved.

U.S. Pat. No. 5,942,082

Inventor: David L. Silverman et al.

Issued: Jul. 13, 1999

A negotiated matching system includes a plurality of remote terminals associated with respective potential counterparties, a communications network for permitting communication between the remote terminals, and a matching station. Each user enters trading information and ranking information into his or her remote terminal. The matching station then uses the trading and ranking information from each user to identify transactions between counterparties that are mutually acceptable based on the ranking information, thereby matching potential counterparties to a transaction. Once a match occurs, the potential counterparties transmit negotiating messages to negotiate some or all terms of the transaction. Thus, the negotiated matching system first matches potential counterparties who are acceptable to each other based on trading and ranking information, and then enables the two counterparties to negotiate and finalize the terms of a transaction.

U.S. Pat. No. 6,023,687

Inventor: James E. Weatherly et al.

Issued: Feb. 8, 2000

A computerized system and method for creating and managing a lease agreement includes a lease control computer (14) including means (18,22) for analyzing and processing predetermined financial information regarding a potential tenant (T) and a potential landlord (L) on behalf of a lease control intermediary, means (24) for evaluating the information to determine the acceptability of the financial risk associated with potential tenant creating a service product in the form of a guaranty (30) directed to periodic lease payments from the lease control intermediary to the landlord (L) for a predetermined amount defining a guaranty limit with the guaranty limit corresponding to a predetermined lime period with the guaranty obligation becoming active upon failure of the potential lessee (T) to pay periodic lease payments: providing a lease agreement (32) for execution by the landlord (L) and tenant (T) and the least control intermediary, and means for depositing periodic lease payments received either from the tenant (T) or made by the lease control intermediary according to the service product into an account held by the landlord (L), the payments having a management fee removed therefrom by the lease control intermediary.

U.S. Pat. No. 6,049,781

Inventor: Pamela Jean Forrest et al.

Issued: Apr. 11, 2000

A relocation tracking system (10) and method are provided. The relocation tracking system (10) includes a mass storage device for storing a relocation database (22) and a processor (40). Relocation database (22) includes a transferee table (44) and a shipping table (48). Relocation database (22) may include any of a variety of other tables such as an expense table (46), a shipping table (48), a home selling table (50), a home buying table (52), a tracking table (54), a non-relocation table (56), and a comment table (58). The processor (40) processes a relocation request that indicates the authorized benefits for each relocation. The processor (40) accesses and updates the transferee table (44) and the shipping table (48) of relocation database (22) in response to processing the relocation request.

U.S. Pat. No. 6,223,165

Inventor: Randall B. Lauffer

Issued: Apr. 24, 2001

This invention provides for a method of (or apparatus for) facilitating the delivery of advice to consumers using a server unit which can store and display the names and characteristics of experts and then rapidly assist in connecting the expert and consumer for real-time communication. The server can also have the ability to receive keywords from the consumer, match those keywords to one or more experts, and tell the consumer how to contact an expert.

U.S. Pat. No. 6,314,404

Inventor: Robert O. Good

Issued: Nov. 6, 2001

A method for managing real estate brokerage referrals in which the referrals are made by a broker for residential real estate. A geographically categorized real estate list is created and reviewed by a potential tenant. From this list the potential tenant makes a selection of a desired apartment complex. An individual referral fee agreement is generated which is specific to the potential tenant and to the specific desired apartment complex. The agreement that is generated is provided to the potential tenant who delivers the agreement to the agent for the desired apartment complex for acceptance by that agent. A broker computer system stores a database of real estate rental listings and is programmed for generating an online brokerage referral fee agreement specific to the potential tenant and the apartment complex when the potential tenant makes a selection of a specific complex from a database. The generated agreement is processed for transfer to a potential tenant computer data processor which provides the brokerage referral fee agreement to the tenant for presentation to the agent for the apartment complex for acceptance.

U.S. Pat. No. 6,321,202

Inventor: William M. Raveis, Jr.

Issued: Nov. 20, 2001

A system and method for managing real estate transactions is provided. The method includes the steps of receiving and storing data relating to a plurality of contacts including buyers and sellers of real estate, receiving and storing data relating to a plurality of vendors each associated with at least one phase of a real estate transaction, accessing vendor data based upon occurrence of a particular phase of the real estate transaction and communicating data relating to the vendors to a contact upon occurrence of the particular phase of the real estate transaction. The system includes means for conducting each of these steps.

U.S. Pat. No. 6,324,519

Inventor: Charles A. Eldering

Issued: Nov. 27, 2001

An advertisement auction system is presented in which content/opportunity providers announce to advertisers that they have an opportunity to present an advertisement to a consumer. The advertiser transmits ad characterization information which is correlated with the consumer profile. Based on the results of the correlation, the advertisers place bids for the advertisement opportunity. Upon acceptance of a bid the advertisement is delivered to the consumer. The system can be applied to a variety of media including Internet advertisements, advertisements delivered over cable television systems, and printed materials such as magazines and periodicals. The system allows consumers to receive more targeted advertisements which match their lifestyle and interests, insures advertisers that their ads will be received by the appropriate audience, and allows the content/opportunity provider the ability to maximize revenue for the advertising opportunity.

While these real estate processing systems may be suitable for the purposes for which they were designed, they would not be as suitable for the purposes of the present invention, as hereinafter described.

SUMMARY OF THE PRESENT INVENTION

The present invention provides a method whereby full service real estate brokers can sell their services to real estate property holders within their territory by reviewing the seller specified maximum commission rate and placing a bid for a commission rate equal to or less than the seller commission rate.

Real estate brokers acquire new clientele by offering their services to sellers of real estate that submit their real estate through a registration process which includes specifying a maximum commission rate they would be willing to pay to a real estate broker for the sale of said real estate. Real estate property owners can save thousands of dollars in commissions costs and still avail themselves of professional full service real estate services.

Real estate brokers using the system of the present invention do not pay sales people listing commissions since the broker acquires the listing rights through the present invention's commission bid system.

The participating registered real estate brokers can bid between or among themselves under the competitive bidding process during the bidding period to bid less than or equal to the seller specified rate which can affect the total commission on the real estate sale.

The present invention provides means for real estate brokers to complete a registration procedure that will involve verifying the brokers submitted information and successfully passing a background check. Once registered the brokers will be territorially classified and be charged a membership fee that may be renewed on a periodic basis. Once registered the brokers will be invited to review descriptions of the properties and sellers specified maximum commission rates for the properties within their territory and bid on acceptance of the seller submitted commission rates. If the real estate broker is willing to accept the sellers posted commission rate they will place a commission rate bid equal to or less than the specified seller's maximum commission rate. Since there can be more than one acceptance on a specific property, brokers will have the opportunity to bid a lower commission rate until the posted bid period is over.

Sellers of real estate can list their properties with the system of the present invention which can save them thousands of dollars in commission fees while providing them with the formidable marketing and experience of full service real estate brokers.

Sellers are required to provide an Exclusive Right to Sell Listing Agreement for a predetermined period of time to anyone of the real estate brokers registered with the system of the present invention that have placed a winning commission rate bid equal to or less than the one stipulated by the seller. If the seller finds no brokers willing to provide their services for the seller posted real estate commission rate, the seller can submit the real estate again to the system of the present invention at a higher commission rate. The business entity can limit the number of times that the property seller can submit a new maximum real estate commission rate.

The main function of the present invention is to create a database of real estate brokers, categorize them into territories and submit for their consideration seller submitted real estate properties having a seller specified maximum sale commission rate. If a broker is interested in handling the property they can submit a commission rate bid equal to or less than the specified seller maximum commission rate.

As an example of the present invention's bidding system compared to the traditional prior art system the following tables demonstrate that substantial savings can be obtained by the real estate sellers while having little to no impact on the brokers income and in some cases can increase the brokers income.

TABLE 1

Sales Comparison-In House Sale-Traditional Method

| Selling Price of Property: | $300,000.00 |
|---|---|
| Commission Rate: | 6% |
| Gross Commission: | $18,000.00 |

| Listing | | Selling | |
|---|---|---|---|
| Broker | Salesperson | Broker | Salesperson |
| $4,500.00 | $4,500.00 | $4,500 | $4,500 |

The broker who listed and sold the property earns $4,500 + $4,500 = $9,000 in commissions.

Bid on Commission Method

| Selling Price of Property: | $300,000.00 |
|---|---|
| Commission Rate: | 4% |
| Gross Commission: | $12,000.00 |

| Listing | | Selling | |
|---|---|---|---|
| Broker | Salesperson | Broker | Salesperson |
| $6,000.00 | $0 | $3,000 | $3,000 |

The broker who listed and sold the property earns $6,000 + $3,000 = $9,000 in commissions.

TABLE 2

Sales Comparison
Multiple Listing Sale-Traditional Method

| Selling Price of Property: | $300,000.00 |
|---|---|
| Commission Rate: | 6% |
| Gross Commission: | $18,000.00 |

| Listing | | Selling | |
|---|---|---|---|
| Broker | Salesperson | Broker | Salesperson |
| $4,500.00 | $4,500.00 | $4,500 | $4,500 |

The broker who listed the property earns $4,500 in commissions.

Bid on Commission Method

| Selling Price of Property: | $300,000.00 |
|---|---|
| Commission Rate: | 4% |
| Gross Commission: | $12,000.00 |

| Listing | | Selling | |
|---|---|---|---|
| Broker | Salesperson | Broker | Salesperson |
| $6,000.00 | $0 | $3,000 | $3,000 |

The broker who listed the property earns $6,000 in commissions.

Referring to Table 1 and Table 2, using the present invention's bid on commission method to list and sell a property, the property owner can pay less commission to the real estate broker when the property is sold saving thousands of dollars in the sales transaction. At the same time, the real estate broker has a chance of earning no less commission than would be earned using the traditional method of listing and selling the property. And, in certain situations, it would be possible for the real estate broker to earn more commission in the sales transaction.

A primary object of the present invention is to provide a system whereby registered real estate property owners can post available real estate through the business entity specifying a maximum sales commission rate for the review and bidding of interested registered real estate brokers located in the zip code or adjoining zip codes where the property for sale is located.

An additional object of the present invention is to provide a computerized online site or other suitable method for the purchase of real estate property broker contracts.

Another object of the present invention is to provide a computerized online site or other suitable place comprised of real estate property broker contracts that can be purchased by any active subscribing real estate broker.

Yet another object of the present invention is to provide a computerized online site or other suitable method where any seller can register and post available real estate property through the business entity with a specified maximum seller paid commission rate.

Yet another object of the present invention is to provide a computerized online site or other suitable method whereby active participating registered licensed real estate brokers can bid against other active participating registered licensed real estate brokers for available real estate properties by lowering their seller paid commission rate bid.

Another object of the present invention is to provide real estate brokers with additional clientele.

Yet another object of the present invention is to minimize the real estate brokers advertising and staff expenses by providing means for rapidly acquiring new clientele through the commission bid system.

Still yet another object of the present invention is to provide real estate sellers with the opportunity to avail themselves of the services of professional full service real estate brokers.

Another object of the present invention is to provide sellers with the opportunity to save thousands of dollars in real estate sales commission fees.

Yet another object of the present invention is to provide sellers with a real estate sales avenue where they can specify the maximum commission rate to be paid to the broker for the sale of the real estate property.

Still yet another object of the present invention is to provide competent full service real estate broker services to the real estate property seller.

Additional objects of the present invention will appear as the description proceeds.

The present invention overcomes the shortcomings of the prior art by providing a method whereby participating registered licensed real estate brokers can acquire from participating registered real estate property owners the exclusive right to sell contract to broker a real estate property for a predetermined period of time based on the broker placing within a specified period of time the lowest commission rate bid for said property that is equal to or less than the threshold commission rate posted by the seller.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS

| | |
|---|---|
| 10 | commission bid system |
| 12 | host server |
| 16 | seller |
| 18 | broker |
| 20 | Internet |
| 22 | personal computer |
| 24 | telephone |
| 26 | land based communications |
| 30 | commission bid broker registration |
| 32 | real estate broker name |
| 34 | real estate broker address |
| 36 | real estate broker telephone number |
| 38 | real estate broker fax number |
| 40 | real estate broker e-mail address |
| 42 | real estate broker state license number |
| 44 | real estate broker contact information |
| 46 | commission bid broker registration verification |
| 48 | real estate broker information written to storage |
| 50 | seller registration |
| 52 | seller name |
| 54 | seller address |
| 56 | seller telephone number |
| 58 | seller property address |
| 60 | description of property |
| 62 | asking price of property |
| 64 | seller specified maximum commission rate |
| 66 | commission bid system verification |
| 68 | seller information written to storage |
| 70 | commission rate bid procedure |
| 72 | display descriptions of available properties |
| 74 | property selection |
| 76 | bid period open |
| 78 | broker submitted commission rate |
| 80 | commission rate verification |
| 82 | territory test |
| 84 | validation test |
| 86 | broker bid posted |
| 88 | broker registration verification |
| 90 | seller registration verification |
| 92 | seller property listed |
| 94 | seller property bid verification |
| 96 | seller signs agreement with broker |

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
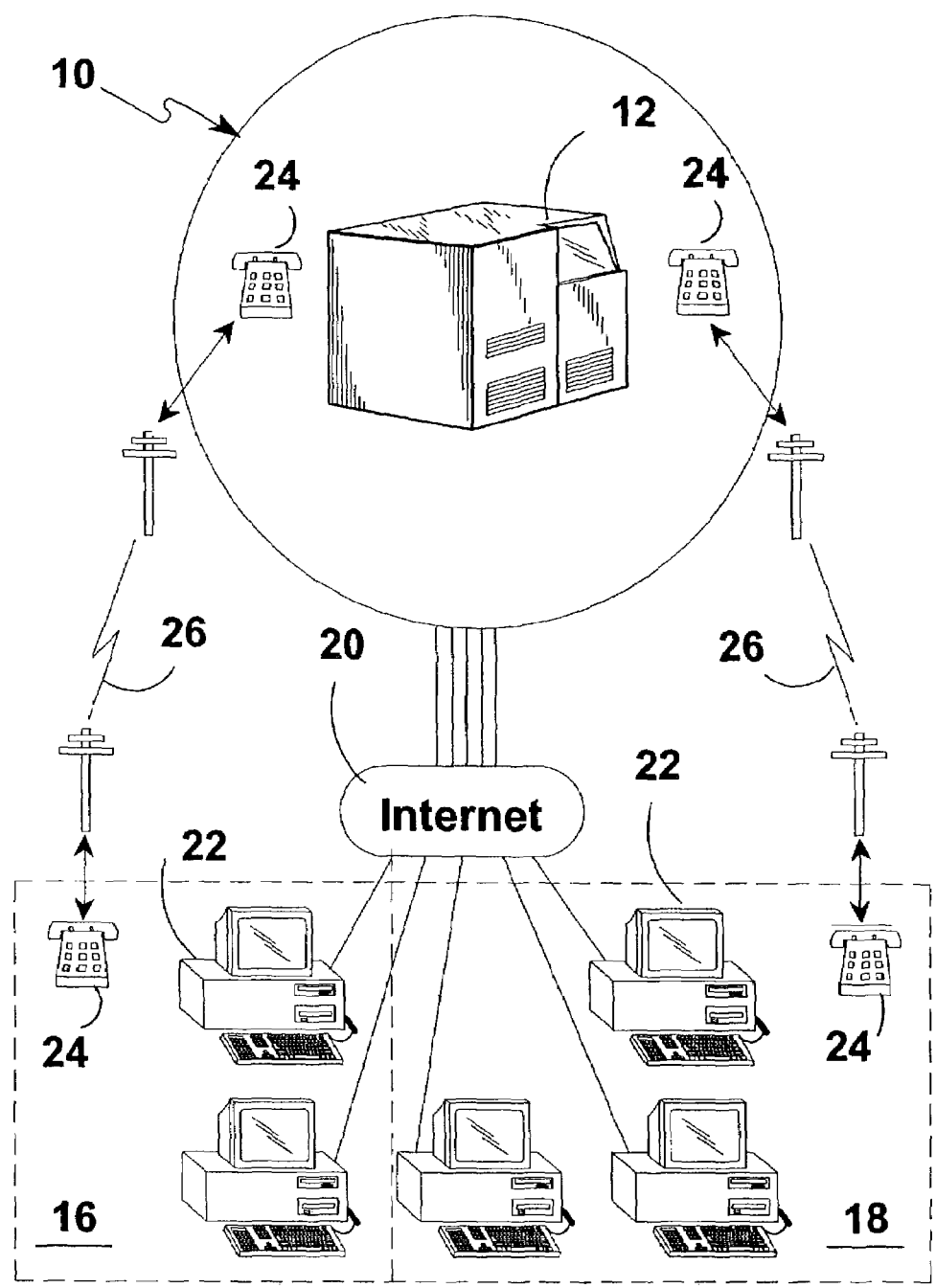
FIG. 1 is a diagrammatic view of the present invention in use.

Referring to FIG. 1, shown is the present invention in use. The commission bid system 10 provide a database where registered real estate brokers 18 can review descriptions of properties submitted by registered real estate sellers 16. The sellers 16 can submit their property to the commission bid system through their telephone 24 using the land based telecommunications system 26 or through personal computer 22 using the internet 20. The commission bid system requires that sellers will provide the winning real estate broker with an Exclusive Right to Sell Listing Agreement to the real estate broker with the lowest commission rate bid equal to or less than that stipulated by the seller. Real estate brokers 18 can submit their organization to the commission bid system 10 whereupon the commission bid system will conduct a registration procedure before adding the real estate broker 18 to the real estate broker database. Once the broker has been added to the real estate broker database they will be invited to review descriptions of real estate properties in their territory and submit commission rate bids equal to or less than those stipulated by the sellers. The broker can submit their bids by telephone 24 and land base communications 26 or a personal computer 22 and the Internet 20.

Figure 2:
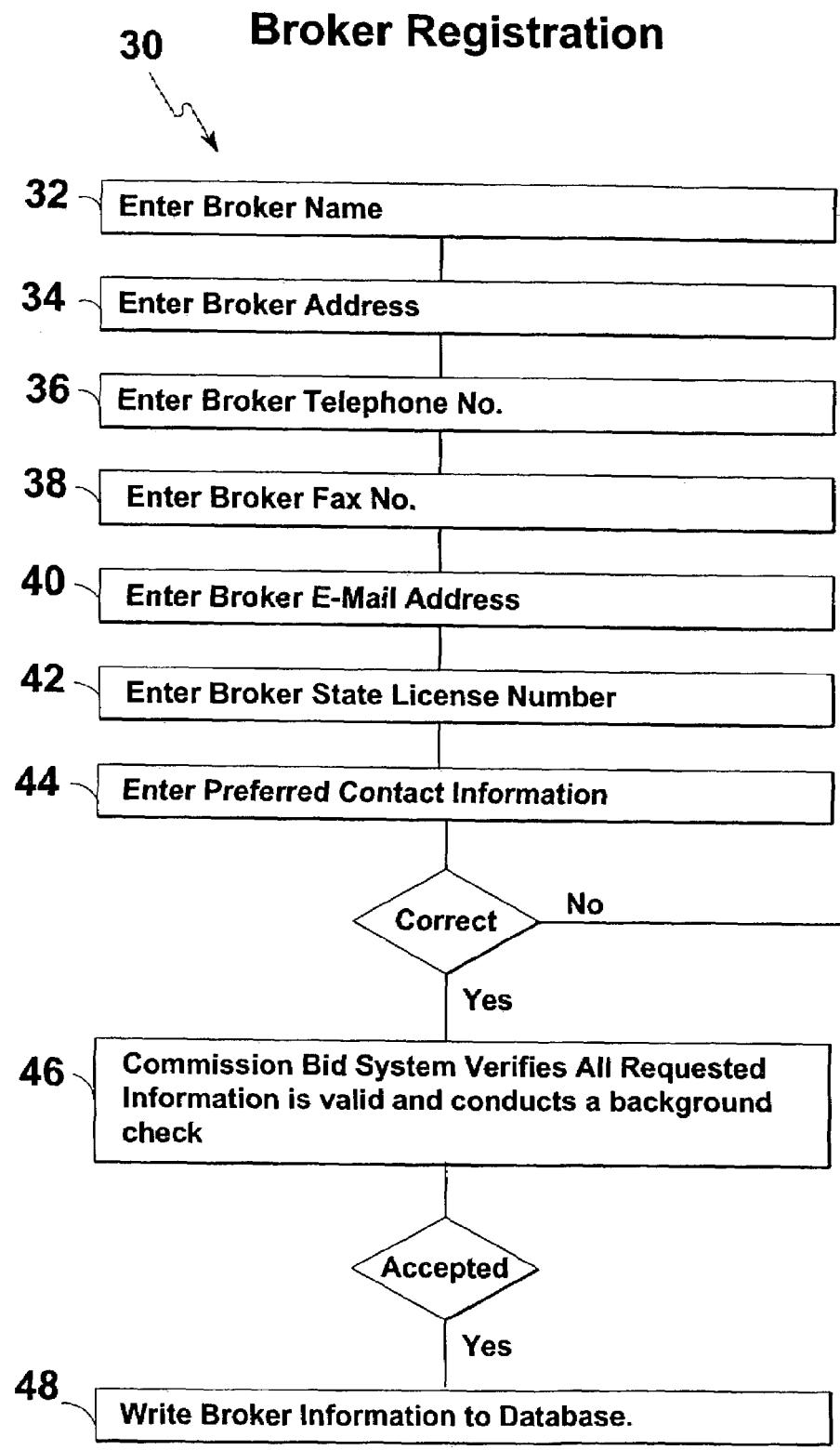
FIG. 2 is a flowchart of the broker registration.

Referring to FIG. 2, shown is the broker registration 30. The broker 18 provides information to the commission bid system 10 that will be verified for accuracy. Basically the information will include name 32, address 34, telephone number 36, fax number 38, e-mail address 40, state license number 42 and preferred method of contact 44. The commission bid system performs a validation procedure and conducts a background check 46 before adding the broker 18 to the broker database 48.

Once added to the broker database the commission bid system 10 when properties become available within the broker's territory will notify the broker. The broker 18 can place a commission rate bid equal to or less than the seller's 16 specified rate any time during the predetermined bid period.

Figure 3:
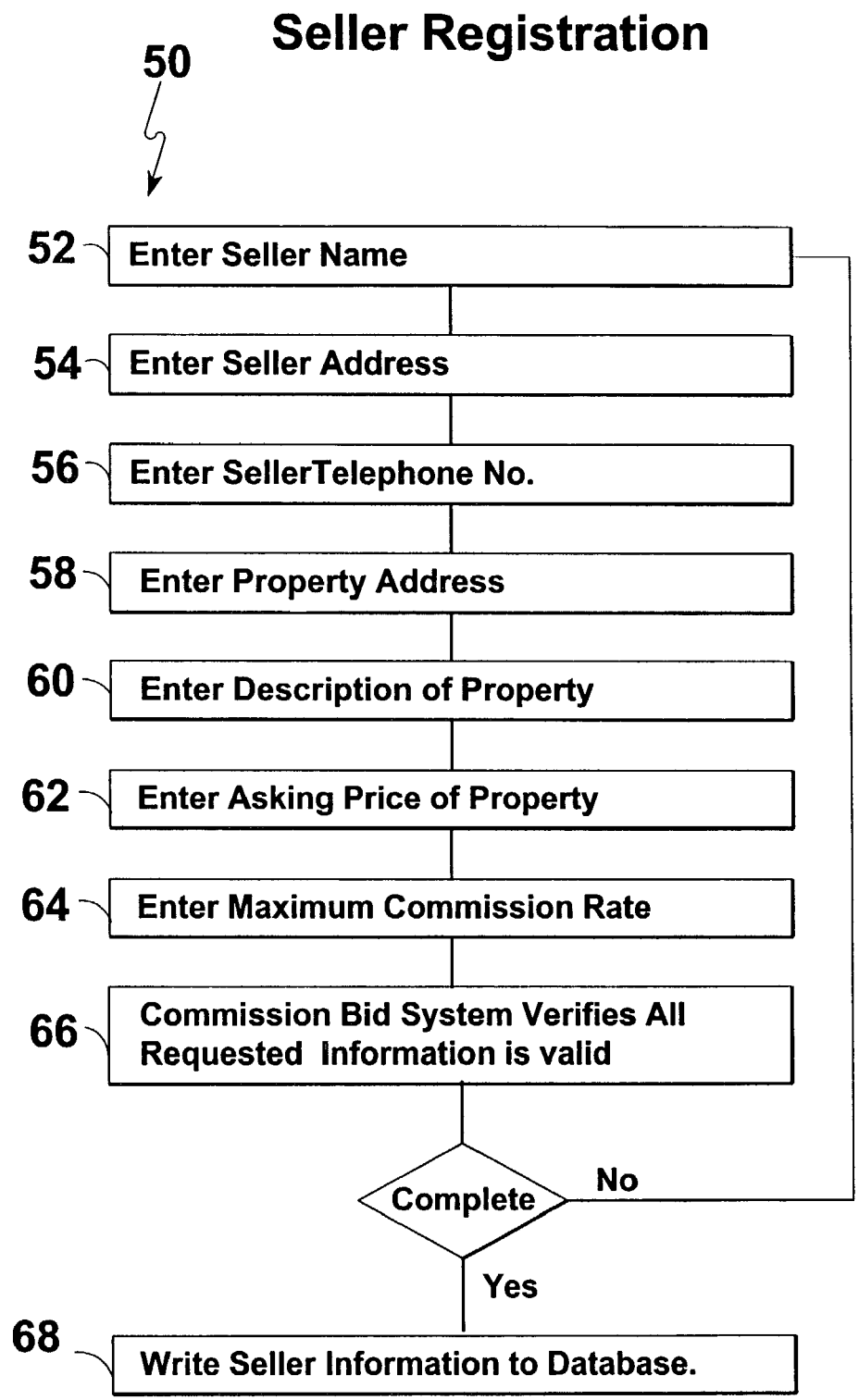
FIG. 3 is a flowchart of the seller registration.

Referring to FIG. 3, shown is the seller registration 50. The seller 16 contacts the commission bid system 10 and provides information regarding the property for sale. The information will include seller name 52, seller address 54, seller telephone number 56 property address 58 description of property 60, asking price of property 62 and maximum commission rate 64. Upon verification of the information by the commission bid system and the sellers agreement to give an Exclusive Right to Sell Listing Agreement to the bid winning broker, the property will be added to the available property database. Based on the property location the commission bid system will contact the appropriate real estate brokers and solicit bids from those brokers. If there are no brokers interested in handling the property at the seller specified commission rate at the end of the bid period the seller can resubmit the property for a higher maximum commission rate. The business entity can limit the number of times that the property seller can submit a new maximum real estate commission rate.

Figure 4:
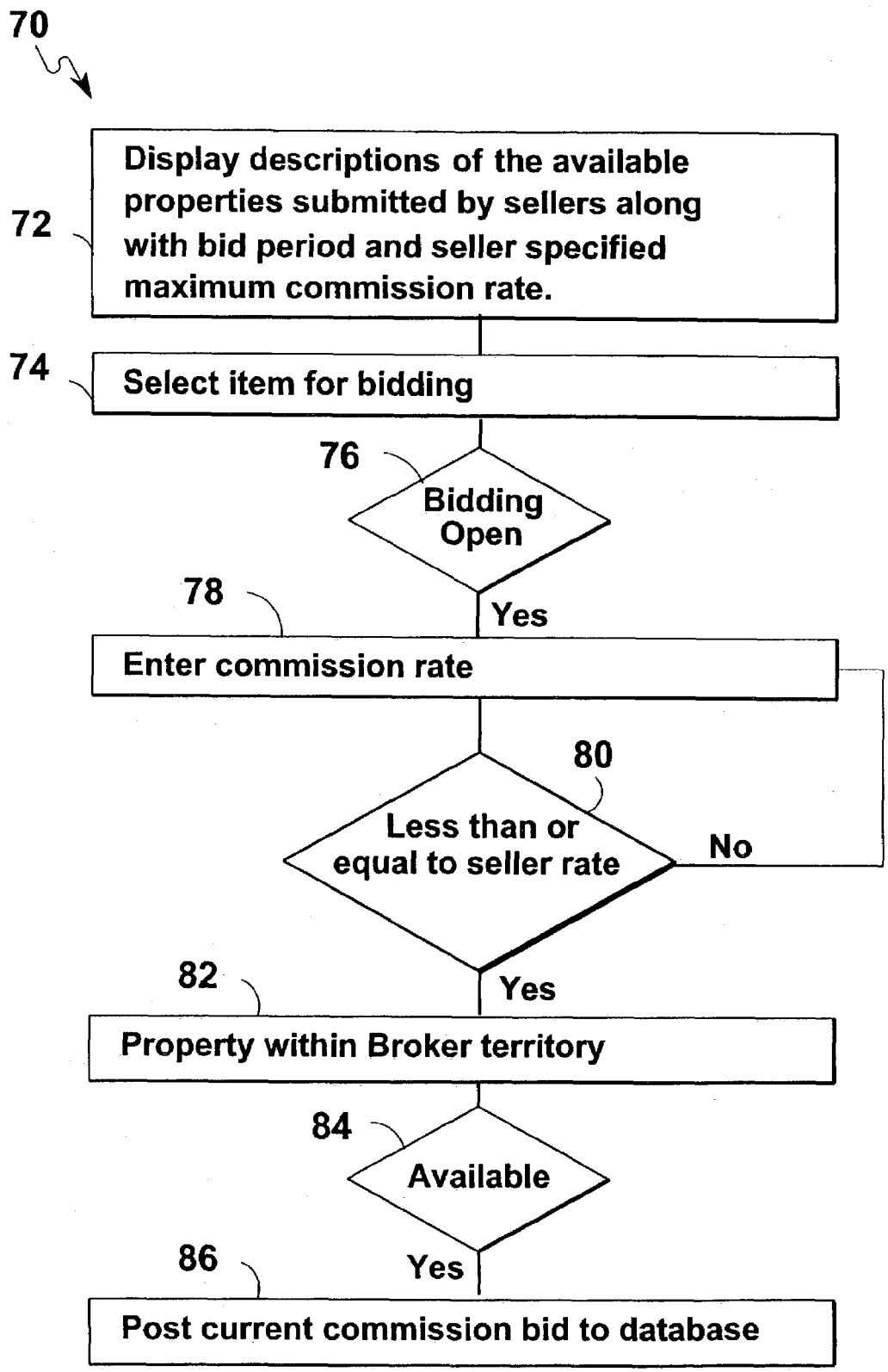
FIG. 4 is a flowchart of the bid procedure.

Referring to FIG. 4, shown is the flowchart of the broker bid procedure 70. All participating registered brokers 18 can view descriptions of the available properties within their territory 72 to ascertain whether they would be willing to provide their services for the seller specified commission rate. The broker can select any listed property within their territory 74 and if the bidding period is still open 76 they can place a commission bid 78. The commission bid system verifies that the broker submitted commission rate bid is less than or equal to the commission rate specified by the seller 80. The commission bid system further verifies that the bid upon property is within the broker's territory 82. After territory verification 84 the broker's bid is posted to the commission bid database 86. If more than one broker is interested in the property and has also submitted a commission bid the broker can submit a commission bid less than or equal to that stipulated by the seller.

Figure 5:
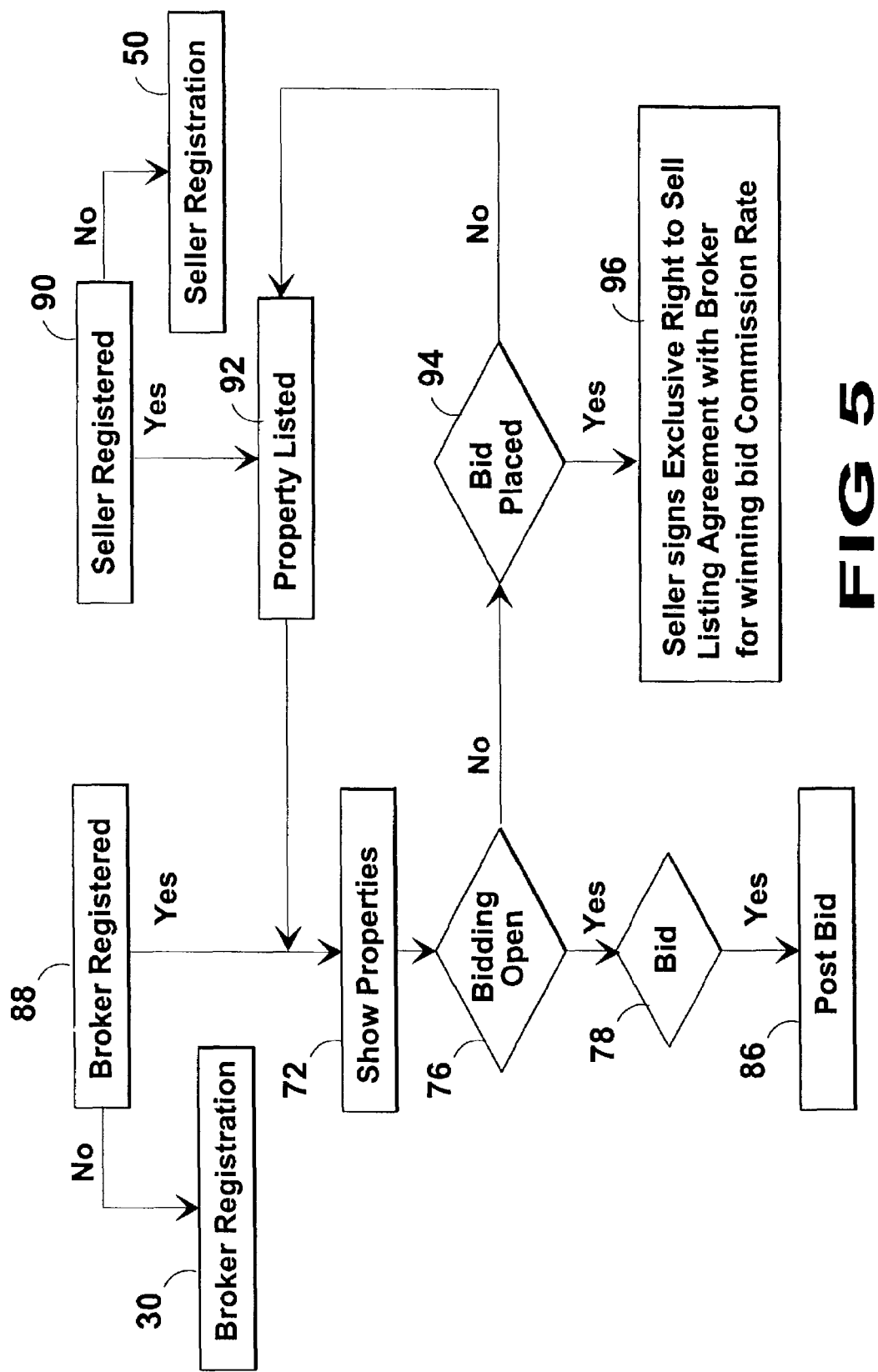
FIG. 5 is an overview of the commission bid system.

Referring to FIG. 5, shown is an overview flowchart of the commission bid system. To participate in bidding on available properties within the commission bid system the broker must be registered 88. If a broker chooses to participate they can complete the registration procedure 30 whereby they may then submit commission bids on available property in their respective territory. Sellers who wish to avail themselves of the commission rate system bid procedure by listing their properties must also be registered 90. If the seller chooses they may complete the registration procedure 50. Once registered the seller 16 can enter their property into the commission bid system 92. Once the bidding period has expired and a bid has been made by a registered broker 94 the seller is obligated to sign an Exclusive Right to Sell Listing Agreement with the winning broker 96. If no broker is willing to offer their services for the seller specified commission rate; the seller can resubmit their property to the commission bid system at a higher commission rate. The business entity can limit the number of times that the property seller can submit a new maximum real estate commission rate.

What is claimed is new and desired to be protected by Letters Patent is set forth in the appended claims:

1. A real estate commission bid method comprising the steps of:
   a) entering into a binding contract between a site administrator and a seller of a real estate property whereby the seller agrees to accept the lowest commission rate bid equal to or less than a seller specified pre bid commission rate submitted by a user who is a registered real estate broker;
   b) the seller entering data into said site regarding the location and description of the real estate and a seller specified acceptable maximum commission rate for the sale of said real estate;
   c) said site creating a database of available real estate properties and the maximum commission rates specified by sellers;
   d) performing a validation procedure and a background check, by a computer, before allowing said real estate brokers access to said database, providing to said registered real estate brokers access to the database of available real estate properties within a predetermined area and the maximum commission rates specified by sellers of said real estate properties;
   e) said site accepting commission rate bids from said registered real estate brokers between a specified start time and end time;
   f) notifying a winning registered real estate broker for a particular real estate property in said data base of seller contact information and notifying seller of winning registered real estate broker contact information; and
   g) in the event that no registered real estate broker submits a bid, said seller submitting a higher acceptable maximum commission rate to said site whereupon said registered real estate brokers may submit new commission bids to said site.

2. The method of claim 1, further comprising the steps of:
a) establishing a communications link between a host computer in said site and at least one remote user computer;
b) querying a remote user computer for the purpose of obtaining detailed sp cation of a bidder session;
b) querying a remote user computer for the purpose of obtaining detailed specification of a bidder session;
c) said host computer receiving electronic answers from said remote user computer;
d) authenticating remote user answers; and
e) recording remote user answers.

3. The method of claim 1, whereby users having a computer possessing Internet access capabilities view available real estate properties posted to the real estate commission bid system on said site.

4. A real estate commission bid method comprising the steps of:
a) establishing a web site in a region for maintaining a list of real estate properties for sale and a seller specified maximum commission rate for each real estate property, said web site registering licensed real estate brokers to participate in a bidding process conducted by web site;
b) said web site contacting and soliciting bids from said registered licensed real estate brokers of acceptable commission rates for a particular real estate property in said web site which said acceptable commission rates are less than or equal to the seller specified commission rate; and
c) said seller, pursuant to an agreement made between said seller and said web site that the seller will accept the lowest commission rate at or below the seller specified commission rate offered by a registered licensed real estate broker, signing an exclusive right to sell listing agreement with the licensed real estate broker bidding the lowest commission rate for said particular real estate property.

5. The method of claim 4 in which participating licensed real estate brokers pay membership fees to participate in the bidding method.

6. The method of claim 5 in which there are multiple regions with a similar web site in each region and a parent organization which supervises all of the web sites, each site paying a licensing fee to said parent organization.

* * * * *